H. B. SHERMAN.
AUTOMOBILE JACK.
APPLICATION FILED JUNE 2, 1919.
1,322,360. Patented Nov. 18, 1919.
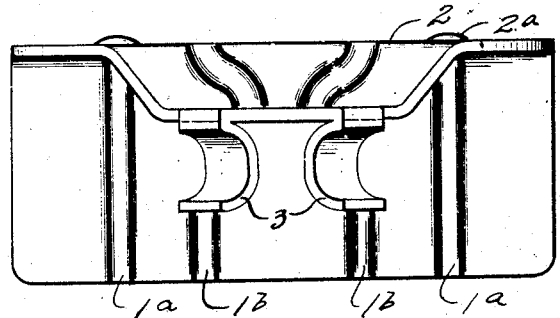
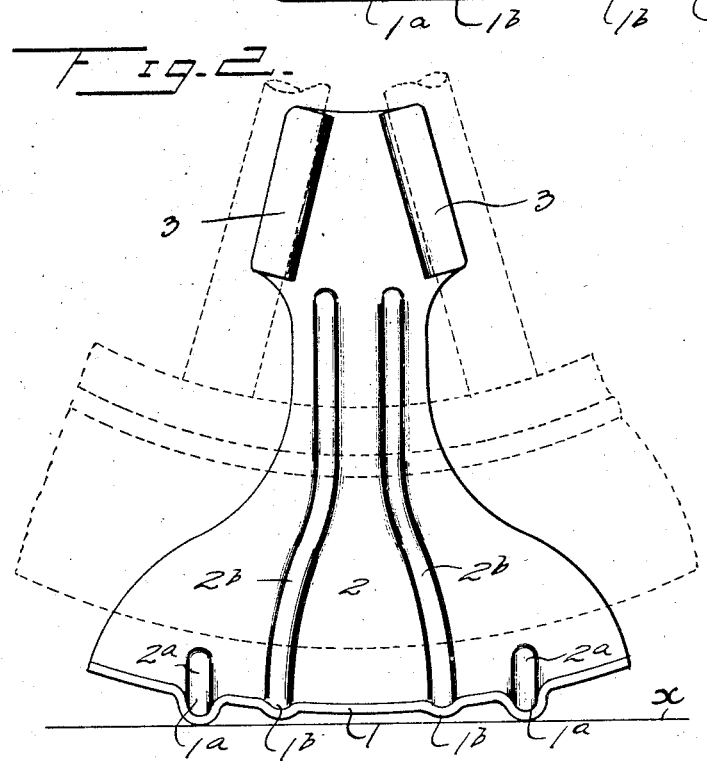
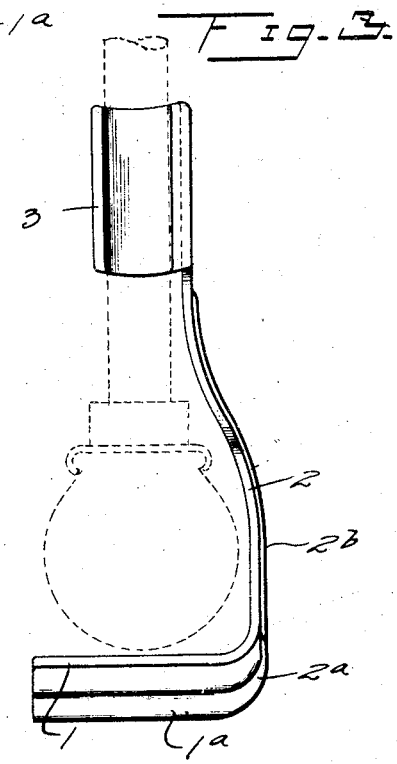
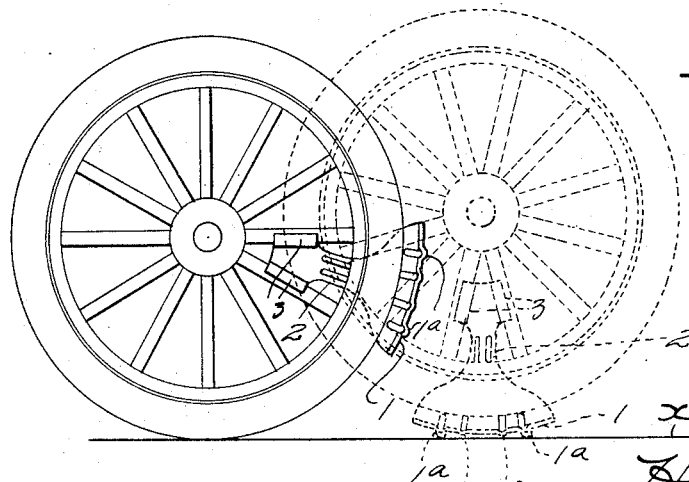
Inventor
Howard B. Sherman
By
Alexander Dowell
Attorneys

UNITED STATES PATENT OFFICE.

HOWARD B. SHERMAN, OF BATTLE CREEK, MICHIGAN.

AUTOMOBILE-JACK.

1,322,360. Specification of Letters Patent. Patented Nov. 18, 1919.

Application filed June 2, 1919. Serial No. 301,227.

*To all whom it may concern:*

Be it known that I, HOWARD B. SHERMAN, a citizen of the United States, residing at Battle Creek, in the county of Calhoun and State of Michigan, have invented certain new and useful Improvements in Automobile-Jacks; and I hereby declare that the following is a full, clear, and exact description thereof, reference being had to the accompanying drawings, which form part of this specification.

This invention is a novel jack for vehicles and is particularly designed for use in connection with automobiles having wheels with detachable tires, so that if it becomes necessary to remove or repair a tire the wheel can be very quickly elevated in position to enable the tire to be readily removed, repaired and re-applied.

The object of the invention is to provide a one-piece jack which can be easily applied to the wheel which it is desired to raise, and will be practically self-positioning, self-sustaining, and self-retaining. The jack can be readily applied to any wheel of the vehicle, and does not require any manipulation of auxiliary attaching or detaching devices to secure it to or disconnect it from a wheel.

I will explain the invention with reference to the accompanying drawings which illustrate one practical embodiment thereof, and then summarize in the claims the essentials of the invention and novel features thereof for which protection is desired.

In the drawings:

Figure 1 is a top plan view of the complete jack.

Fig. 2 is a front view thereof, part of a wheel supported thereby being indicated in dotted lines.

Fig. 3 is an edge view thereof, part of a wheel supported thereby being indicated in dotted lines.

Fig. 4 is a detail side view illustrating the manner of using the jack.

The novel jack is preferably formed integrally out of metal, and preferably stamped out of sheet metal. It comprises a base portion 1 which is preferably curved longitudinally, when viewed from the front, and is provided with transverse ribs or facets 1ª near each of its outer ends and with intermediate shallow ribs or facets 1ᵇ. Preferably the ribs 1ª are deeper or larger than the ribs 1ᵇ so that when the jack is in working position, as indicated in Fig. 2, all of the ribs 1ª, 1ᵇ will contact with the surface of the ground, indicated by the line X.

From one edge of this base 1 rises a standard 2, preferably formed integral with the base, and slightly inclined or curving inwardly above the base as shown in Figs. 1 and 3. This standard 2 is preferably contracted so that it is narrower at top than at bottom as shown. The standard is preferably provided with stiffening ribs 2ᵇ which may merge into, or connect at bottom with, ribs 1ᵇ; and it also may be provided with shorter stiffening ribs 2ª which may connect, or merge at bottom, with the ribs 1ª.

Integrally connected with the upper end of the standard 2 are oppositely inclined spoke engaging members 3 which project over the base 1, and diverge from top to bottom, on radial lines approximating the divergence of the spokes of an ordinary wheel, whose axis would be at the center of the circle from which the members 3 radiate. These spoke engaging members 3 are also preferably curved in cross-section as indicated in Fig. 1.

The upper part of standard 2 is preferably bent or deflected as shown in Figs. 1 and 3 so that the vertical median lines of the spoke engaging members 3 are practically in the plane of the longitudinal median line of the base member 1.

As stated the jack is preferably made integral, and preferably out of pressed steel, although it obviously might be cast, but by pressing it out of sheet metal it can be made lighter than if made out of cast metal of equal strength.

In using the device the spoke-engaging members 3 are entered between two adjacent spokes of the wheel of the machine which it is desired to raise in about the position shown in full lines in Fig. 4; then the jack is shoved inwardly until the spoke engaging members engage two adjacent spokes, and the base 1 of the jack then lies close to the rim of the wheel but not in contact therewith, (see Fig. 4) the standard 2 being at the inside of the wheel. Then by moving the wheel slightly forward the wheel rolls up on the jack and the wheel is elevated on the jack as indicated in dotted lines in Figs. 2, 3 and 4.

This jack can be readily applied to and detached from the wheel, and the wheel can be rolled easily upon the jack into elevated position as shown in Fig. 4, the wheel being supported clear of the ground, enabling the operator to remove and replace the wheel tire. This novel jack is quicker in operation than an ordinary jack; and is easily portable, light, compact and inexpensive.

What I claim is:

1. An automobile jack comprising a curved base portion adapted to contact the ground; an integral standard rigidly connected with and rising from this base portion; and oppositely disposed relatively fixed spoke engaging-members rigidly connected with opposite sides of the upper part of the standard and diverging toward the base and adapted to be entered between and engage adjacent spokes, substantially as described.

2. The herein described automobile jack consisting of a curved base portion provided with transversely disposed ribs adapted to contact the ground when the standard is in vertical position; a standard rising from one side of this base portion and formed integral therewith; and oppositely disposed curved spoke engaging-members formed integral with the upper part of the said standard at opposite sides and diverging toward the base, and adapted to be entered between adjacent spokes, said standard being curved or bent so that the spoke engaging-members are disposed vertically above the central line of the base.

3. An automobile jack formed out of pressed sheet metal consisting of a curved base portion provided with transversely disposed ribs the outermost ribs being larger than the inner ribs and adapted to contact the ground when the inner ribs contact therewith and the standard is in vertical position; an integral standard rising from one side of this base portion and having integral strengthening ribs connecting with the transverse ribs of the base plate; and oppositely disposed curved spoke engaging-members formed integral with the upper part of the standard and at opposite sides thereof, and diverging toward the base, and adapted to be entered between adjacent spokes; the standard being so curved or bent that the spoke engaging-members are disposed vertically above the longitudinal median line of the base.

In testimony that I claim the foregoing as my own, I affix my signature.

HOWARD B. SHERMAN.